United States Patent [19]

Nimer et al.

[11] 4,376,830

[45] Mar. 15, 1983

[54] SULFUR CEMENT-AGGREGATE-ORGANOSILANE COMPOSITIONS AND METHODS FOR PREPARING

[75] Inventors: Edward L. Nimer, San Rafael; Robert W. Campbell, Lafayette, both of Calif.

[73] Assignee: Chevron Research Company, San Francisco, Calif.

[21] Appl. No.: 291,587

[22] Filed: Aug. 10, 1981

[51] Int. Cl.³ .............................................. C04B 33/04
[52] U.S. Cl. ............................... 501/140; 106/287.13; 106/287.16; 106/287.32
[58] Field of Search .................. 501/140; 106/287.13, 106/287.16, 287.32

[56] References Cited

U.S. PATENT DOCUMENTS 4,164,428 8/1979 Simic ............................... 106/287.32
4,188,230 2/1980 Gillott et al. ........................ 501/140

*Primary Examiner*—James Poer
*Attorney, Agent, or Firm*—D. A. Newell; T. G. DeJonghe; L. S. Squires

[57] ABSTRACT

Sulfur cement-aggregate compositions comprising a sulfur cement and an aggregate containing an expansive clay and processes for preparing such compositions. The processes, and resulting compositions, are characterized by the addition of certain organosilanes in the composition prior to solidifying (cooling) the composition. The resulting solidified composition has improved water stability.

The compositions can be used as mortars or concretes depending on the particle size of the principal aggregate component.

18 Claims, No Drawings

SULFUR CEMENT-AGGREGATE-ORGANOSILANE COMPOSITIONS AND METHODS FOR PREPARING

BACKGROUND OF THE INVENTION

1. The Invention

This invention relates to sulfur cement-aggregate compositions. In a further aspect, the invention relates to sulfur mortars and concretes containing an aggregate which is contaminated with a water-expandable clay.

2. The Prior Art

Sulfur mortars and concretes generally refer to a mixture of sulfur and aggregate wherein the sulfur functions as the cement or binder. Generally, whether a composition is classed as a mortar or concrete is based on the particle size of the predominate aggregate. Thus, compositions containing larger sized aggregates are generally referred to as concretes whereas compositions containing smaller sized aggregate are referred to as mortars. In either case, the compositions can also contain very fine particle size aggregates, such as fly ash, etc., as fillers. Sulfur mortars and concretes are prepared by heating sulfur with an aggregate at a sufficient temperature to render the sulfur molten and then allowing the mixture to cool to solidify the sulfur. Not infrequently, the sulfur also contains a plasticizer which desirably increases the cold plasticity crystallization time of the sulfur, probably by reacting with at least a portion of the sulfur. Such sulfur is referred to as plasticized sulfur.

Sulfur mortars and concretes can be broadly classified as sulfur cement products. Sulfur cement is similar to Portland cement in forming concretes or mortars. In the latter case, a mixture of Portland cement and aggregate is solidified into a final solid product by treatment with water. In the case of sulfur products, heat is required to render the sulfur cement molten, which, upon cooling, solidifies, binding the aggregate.

Sulfur cement concretes can be used for many of the same purposes as conventionally formed concretes. For example, sulfur concretes can be used for structural members, roads, slabs, curbings, gutters, and can be precast or cast at the job site. Sulfur cement concrete affords a significant advantage over Portland cement concrete, especially in the case of preformed articles, in that the sulfur cement concrete can be remelted and recast. Thus, when defective or surplus articles are prepared, the sulfur aggregate composition can be re-used by merely melting down the article and recasting the composition. Sulfur cement mortars can be used for similar purposes as Portland cement mortars, such as, for example, bonding structural members together. Sulfur cement mortars and concretes also generally have good corrosion resistance to acids and other chemicals.

Sulfur cement mortars and concretes are wellknown to the art and various modifications are, for example, described in the patent literature, for example, U.S. Pat. Nos. 2,135,747, 3,954,480, 4,025,352, 4,058,500, and 4,118,230.

U.S. Pat. No. 4,164,428 discloses that a plasticized sulfur coating composition comprising at least 50 wt % sulfur, optionally containing aggregate, is strengthened and stabilized by the incorporation therein of a finely divided particulate mineral suspending agent and an organosilane stabilizing agent. U.S. Pat. Nos. 4,036,661 and 4,038,096 disclose the use of certain silanes in bituminous or asphalt surfacing composition to promote adhesion of the bitumen or asphalt to aggregate. U.S. Pat. No. 4,154,619 discloses asphalt-sulfur emulsions containing up to 50% sulfur having improved emulsion stability through the incorporation of an organosiloxane polymer.

One of the disadvantages of sulfur cement mortars and concretes is that the presence of even small amounts of water-expandable clay (for example, 1% by weight or more) in the aggregate causes the solidified sulfur cement mortars and concretes to disintegrate when exposed to water. This problem is particularly serious since, because of transportation costs, economic necessity usually requires the use of aggregate sources close to the casting or job site, regardless of the presence of expansive clay. The expansive clay can be removed from the aggregate by washing procedures but such procedures are also generally inconvenient and uneconomical. Thus, if the local sources of aggregate contain expansive clay, the use of sulfur cement mortars concretes is pragmatically severely restricted.

U.S. Pat. No. 4,188,230 teaches that this problem may be obviated by the incorporation of petroleum or polyol additives. Such procedures have not, in fact, proved entirely satisfactory. The problem of water-expansive clays is also considered in an article by Shrive, Gillott, Jordaan and Loov, appearing at Page 484 of the *Journal of Testing and Evaluation* (1977).

In the commonly assigned co-pending application U.S. Ser. No. 237,350, filed Feb. 23, 1981, B. S. Albom discloses that the water stability of sulfur cement-aggregate products containing aggregate having up to about 5% weight expandable clay can be substantially improved by treating this aggregate with a salt solution prior to admixture with the sulfur cement.

SUMMARY OF THE INVENTION

It has now been discovered that the water stability of sulfur cement-aggregate compositions containing aggregate containing up to about 5% expansive clay based on the weight of the aggregate can be very substantially improved by the simple incorporation of an effective amount of an organosilane having at least one reactive functional group. This invention is important to the commercialization of sulfur cement mortars and concretes, because the treatment is effective and merely requires the addition of a small amount of the organosilane to the aggregate. Further, the invention has broad applicability, because most aggregates contain less than 5% by weight of expansive clay and generally contain less than about 3% by weight.

In one embodiment, the invention comprises a sulfur cement-aggregate composition, comprising sulfur cement and an aggregate, containing up to about 5% by weight, and preferably less than 4% by weight, based on the aggregate, of an expansive clay and containing in admixture with said aggregate an amount of an organosilane effective to substantially reduce the water expandability of said expansive clay, and wherein said organosilane has at least one reactive functional group.

In one embodiment, the invention provides a process for preparing a sulfur cement-aggregation composition containing an aggregate having up to 5% by weight, based on the aggregate, of expansive clay which comprises the improvement of admixing with the ingredients of said composition an amount of an organosilane effective to substantially reduce the water expandability of said expansive clay, and wherein said organosilane has at least one reactive functional group.

The invention will be further described hereinbelow.

FURTHER DESCRIPTION OF THE INVENTION AND PREFERRED EMBODIMENTS

The present composition can be prepared, in accordance with the present process by simply adding the appropriate organosilane to the ingredients of the composition. Because of the small amount of organosilane used, it is typically mixed with the sulfur cement, though it could also be added directly to the aggregate or the molten mixture of the sulfur cement and aggregate. The molten mixture is then preferably mixed to distribute the aggregate and organosilane throughout the sulfur cement. The organosilane can be added as a solid or liquid and generally will be applied in its usual commercial form. If desired where the particular organosilane is supplied commercially as a solid it can be applied as a liquid (e.g., by melt liquefying or dissolution or suspension in a volatile solvent or carrier).

As is conventional, it is preferred to heat the aggregate prior to admixture with the molten-sulfur cement to avoid random cold spots, remove entrained moisture, and improve bonding of the sulfur cement to the aggregate. With the exception that it is preferred to add the organosilane to the sulfur cement, the order of addition of the various other ingredients is not significant. Although, as is conventional, where plasticized sulfur is used as the sulfur cement, it is generally preferred to add the plasticizer to the sulfur before adding the aggregate. The sulfur cement, aggregate and any other ingredients are mixed together at temperatures above the melting point of the sulfur cement (i.e., sulfur or plasticized sulfur) and below the decomposition or boiling point of the materials. Typically, mixing is effected at temperatures in the range of about from 110° to 180° C. and preferably, about from 125° to 160° C. The molten mixture is then cast into the desired shape or form, in the case of concrete, or applied in the case of mortar. Upon cooling, the composition solidifies into a final product having improved water stability.

Typically, about from 0.0015 to 0.015 g-mol, preferably about from 0.0038 to 0.0075 g-mol, of organosilane is used per kilogram of expandable clay contaminated aggregate. In terms of a more convenient weight-to-weight basis, generally about from 0.25 to 3 parts by weight, preferably about from 0.65 to 1.5 of the organosilane are used per 1000 parts by weight of expandable clay contaminated aggregate.

Appropriate organosilanes which can be used in the present invention are those organosilanes which have at least one molten-sulfur reactive group which reacts with sulfur or which converts in the presence of molten-sulfur to such a group and, of course, a boiling point and decomposition temperature above the melting point of the particular sulfur cement used. The term molten-sulfur reactive group, as used herein, means a group which reacts with sulfur or which converts in the presence of molten-sulfur to a group which reacts with sulfur. Examples of such molten-sulfur reactive groups include, for example, amino, diamino, epoxy, carbonyl, methacryloxy, aryl, (e.g., phenyl) mercapto, double bonds, alkyl having at least two carbon atoms, and the like.

Suitable organosilanes which can be used include, for example, those organosilanes having the formula:

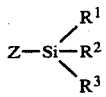

wherein $R^1$, $R^2$, and $R^3$ are independently selected from the group consisting of lower alkoxy, aryloxy, aralower alkoxy, and halo; and Z is an organic radical attached to Si via a carbon atom and has at least one molten-sulfur reactive group, such as, for example, amino, epoxy, double bond, triple bond, mercapto, cyano, hydroxy, aryl, substituted aryl, aralkyl, substituted aralkyl, carbonyl, alkyl having 2 through 20 carbon atoms (including the carbon atom of R attached to Si) cycloalkyl, and the like.

Typical Z groups include, for example, aminoalkyl, aminoalkylene-aminoalkyl, N-lower alkyl aminoalkyl, epoxyalkyl; epoxyalkoxyalkyl; alkenyl, alkynyl, mercaptoalkyl, alkylthioalkyl, cyanoalkyl, hydroxyalkyl, aryl, substituted aryl, arylalkyl, substituted arylalkyl, alkyl having at least 2 carbon atoms, cycloalkyl, cycloalkenyl, arylalkyl, aryloxyalkyl, preferably having 2 through 12 carbon atoms.

(In the case where Z is hydrocarbyl it is believed that its sulfur reactivity is due to a single bond which converts to a double bond in presence of molten-sulfur).

The preferred organosilanes are those wherein R has at least one molten-sulfur reactive group selected from the group of amino, epoxy (especially glycidoxy), and/or methacryloyloxy mercapto. In terms of the $R^1$, $R^2$, and $R^3$ groups the preferred organosilanes are those wherein $R^1$, $R^2$, and $R^3$ are lower alkoxy or aryloxy and especially lower alkoxy, for example, methoxy and ethoxy. Preferably, organosilanes having a combination of at least one preferred molten-sulfur reactive group and preferred $R^1$, $R^2$ and $R^3$ groups are used.

The organosilanes are commercially available as coupling agents and adhesion promoters used with various polymeric materials such as epoxy resins, polyesters, polycarbonates, nylons, sulfur-cured elastomers, and mineral-filled compositions. Suitable organosilanes can thus be purchased or prepared via conventional procedures. Suitable organosilanes which can be used in the present composition include for example, vinyltriethoxysilane, gamma-methacryloxypropyltrimethoxysilane, beta-(3,4-epoxycyclohexyl)-ethyltrimethoxysilane, gamma-glycidoxypropyltrimethoxysilane, gamma-aminopropyltrimethoxysilane and gamma-mercaptopropyltrimethoxysilane, and the like and compatible mixtures thereof.

The preferred organosilanes are those wherein R is mercapto, epoxy, methacryl, amino or diamino, and/or $R^1$, $R^2$ and $R^3$ are independently selected from the group of alkyl and aryl, and especially methyl and ethyl.

The remaining components of the sulfur cement aggregate compositions are not unique to the present invention save that the present invention permits the use of aggregate containing an otherwise deleterious amount (e.g., about 1% or more) of expandable clay up to about 5% weight, based on the aggregate, and preferably up to about 3% by weight in terms of producing a product having excellent water resistance. Also in terms of the sulfur cement, better results are obtained using plasticized sulfur than with pure sulfur.

The principal sub-genuses of the present composition are sulfur cement mortars and sulfur concretes. The two compositions are actually very substantially the same with the exception of the size of the principal aggregate component. Typically, in the case of the present sulfur cement mortars, the mortar contains about from 10 to 50% by weight, preferably about from 15 to 25% by weight, of sulfur cement and about from 50 to 90% by weight, preferably about from 75 to 85% by weight, fine-size aggregate. Typically, fine-size aggregate generally has a particle size less than about No. 4 mesh (U.S.A. Standard Testing Sieves), and about 50 to 100, preferably less than about No. 16 mesh, (U.S.A. Standard Testing Sieves). Suitable fine-size aggregate include, for example, various sands, for example, plaster, monterey, Kaiser, and Texas sands, and the like.

Sulfur cement concretes are similar to the sulfur cement mortars except that larger-size aggregate is used along, with, or in place of all or a portion of the smaller-size aggregate. Typically, the larger-size aggregate has a particle size of about from No. 4 to 1½, preferably about from ⅜" to ¾". The small sized aggregate generally has a particle size below about No. 8 mesh (U.S.A. Standard Testing Sieve) and preferably, below 16 mesh and preferably predominantly above 40 mesh. Suitable examples of such small-sized aggregate have already been illustrated hereinabove with respect to the sulfur cement mortars. Typically, the sulfur cement concrete comprises, by weight, about from 10 to 50% sulfur cement; 20 to 60% large-size aggregate; and 30 to 70% fine-size aggregate.

The sulfur cement can be unaltered sulfur and/or plasticized sulfur and if desired can contain minor amounts of various compatible additives (e.g. flame retardants, ductilating agents, etc.). The term plasticized sulfur refers to the reaction product of sulfur with a plasticizer and/or mixtures of sulfur and plasticizers and/or the reaction product of sulfur with a plasticizer. Although it is not wholly necessary to use plasticized sulfur as the sulfur cement, the compositions of invention using plasticized sulfur generally have much superior water stability to the corresponding composition using sulfur without a plasticizer. Where a plasticizer is used, the amount of the plasticizer(s) will vary with the particular plasticizer and the properties desired in the cement. The cement can contain about from 0.1 to 10% of the plasticizer and typically will contain about from 2 to 7, preferably about 2½ to 5% by weight, based on the total weight of both free and combined (or reacted) sulfur in the composition (herein referred to as "total sulfur").

The term "sulfur plasticizer" or "plasticizer" refers to materials or mixtures of materials which, when added to sulfur, lower its melting point and increase its crystallization time. One convenient way to measure the rate of crystallization is as follows: the test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include, for example, the sulfide of iron, arsenic and phosphorus, etc. Generally, the preferred plasticizers are organic compounds which react with sulfur to give sulfur-containing materials.

Suitable sulfur plasticizers which can be used include, for example, aliphatic polysulfides, aromatic polysulfides, styrene, dicyclopentadiene, dioctylphthalate, acrylic acid, epoxidized soybean oil, triglycerides, tall oil fatty acids, and the like and compatible mixtures thereof.

One class of preferred plasticizers is the aliphatic polysulfides, particularly those that will not form crosslinking. Thus, butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten-sulfur, dicyclopentadiene forms an extremely satisfactory aliphatic polysulfide.

Another class of preferred plasticizers for use in the composition of the present invention are aromatic polysulfides formed by reacting one mol of an aromatic carbocyclic or heterocyclic compound, substituted by at least one functional group of the class —OH or —NHR in which R is H or lower alkyl with at least two mols of sulfur.

Suitable organic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. Vol. 70, No. 12, Pages 351-67 (1958), the polysulfide product made in this way has a mol ratio of aromatic compound: sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5% to 60% by weight linear aliphatic polysulfide, based on total plasticizer, preferably about 20% to 50% by weight.

These aliphatic polysulfides can have branching indicated as follows:

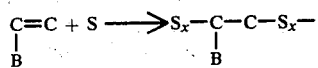

wherein x is an integer of from 2 to 6 and wherein B is H, alkyl, aryl, halogen, nitrile, ester or amide group. Thus, in this connection the aliphatic polysulfide is preferably a linear polysulfide. The chain with the sulfur preferably is linear, but it can have side groups as indicated by B above. Also, this side group B may be aromatic. Thus, styrene can be used to form a phenyl-substituted linear aliphatic polysulfide. The preferred aliphatic polysulfides of this type are both linear and nonbranched.

Unbranched linear aliphatic polysulfides include those such as Thiokol LP-3 which contains an ether linkage and has the recurring unit: —$S_xCH_2CH_2OCH_2OCH_2CH_2S_x$— wherein x has an average value of about 12. The ether constituent of this aliphatic polysulfide is relatively inert to reaction. Other suitable aliphatic polysulfides have the following recurring units:

—$S_x$—(—$CH_2$—)$_y$—$S_x$— from reaction of alpha, omega-dihaloalkanes and sodium polysulfide;

—$S_x$—(—$CH_2CH_2$—S—$CH_2CH_2$—)$_y$—$S_x$— from reaction of alpha, omega-dihalosulfides and sodium polysulfide; and —$S_x$—(—$CH_2CH_2$—O—$CH_2CH_2$—)$_y$—$S_x$— from reaction of alpha, omega-dihaloesters and sodium polysulfide wherein x is an integer of 2 to 5; and y is an integer of 2 to 10.

In some instances, it is preferred to use mixtures of materials having different reactivities with sulfur as the plasticizer. For example, very good results can be obtained using a mixture of cyclopentadiene and/or dicyclopentadiene with oligomers of cyclopentadiene. Various plasticizers are also described in the art, for example, see U.S. Pat. Nos. 4,058,500 and 4,190,460.

The sulfur cement can also contain very fine particle sized fillers such as, for example, fly ash, talc, mica, silicas, graphite, carbon black, pumice, insoluble salts (e.g., barium carbonate, barium sulfate, calcium carbonate, calcium sulfate, magnesium carbonate, etc.), magnesium oxide, and mixtures thereof. Such fillers typically have a particle size less than 100 mesh (U.S.A. Standard Testing Sieve) and preferably, less than 200 mesh. Such fillers generally act as thickening agents and generally improve the hardness or strength of the sulfur cement product. Where fillers are used, the sulfur cement typically contains about from 1 to 15%, and more generally, about from 5 to 10% of the filler, based on the weight of total sulfur.

Also, various additives can be added as desired to alter various properties of the sulfur cement, as is well-known to the art; see, for example, U.S. Pat. Nos. 4,188,230 (durability altered by the addition of certain petroleum products); and 4,210,458 (viscosity altered by the addition of polyhydric alcohols).

Definitions

As used herein the following terms have the following meanings unless expressly stated to the contrary.

All mesh sizes are given in and refer to U.S.A. Standard Testing Sieves sometimes also referred to as the U.S. Sieve Series.

The term "alkyl" refers to both straight- and branched-chain alkyl groups and also includes alkylenes. Generally such alkyl groups have 1 through 20 carbon atoms. The term "lower alkyl" refers to both straight- and branched-chain alkyl groups having a total from 1 through 6 carbon atoms and includes primary, secondary and tertiary alkyl groups. Typical lower alkyls include, for example, methyl, ethyl, n-propyl, isopropyl, n-butyl, t-butyl, n-hexyl and the like.

The term "alkylene" refers to both straight- and branched-chained alkylene groups. The term "lower alkylene" refers to alkylene groups having from 1 through 6 carbon atoms. Typical alkylene groups include, for example, methylene, ethylene (i.e., —$CH_2$—$CH_2$—) 2-methylpropylene

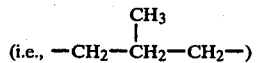

(i.e., —$CH_2$—$CH_2$—$CH_2$—)

and the like.

The term "cycloalkyl" refers to cycloalkyl groups having 3 through 12 carbon atoms and includes both monocyclic (e.g., cyclopropyl) and polycyclic (e.g., bicyclo[3,2,1]octyl) alkyls. The term "cycloalkenyl" refers to cycloalkyl but having at least one degree of unsaturation (i.e., at least one ring double bond).

The term "alkenyl" refers to unsaturated alkyl groups having a double bond (e.g., $CH_3CH=CH(CH_2)_2$—,) and includes both straight- and branched-chain alkenyl groups.

"Lower alkenyl" groups refer to alkenyl groups having from 2 through 6 carbon atoms. Typical lower alkenyl groups include, for example, ethylene; but-3-enyl; hex-4-enyl; 2-methylpent-4-enyl and the like.

The term "alkynyl" refers to unsaturated alkyl groups having a triple bond (e.g., $CH_3C\equiv C(CH_2)_2$—) and includes both straight- and branched-chain alkynyl groups.

The term "lower alkynyl" refers alkynyl groups having from 2 through 6 carbon atoms and includes, for example, but-3-ynyl; hex-4-ynyl; 3-methylpent-4-ynyl and the like.

The term "halo or halogen atom" refers to the groups fluoro, chloro and bromo.

The term "alkoxy" refers to the group $R^1O$— wherein $R^1$ is alkyl.

The term "lower alkoxy" refers to alkoxy groups having from 1 through 6 carbon atoms and includes, for example, methoxy, ethoxy, t-butoxy, hexoxy and the like.

The term "lower alkoxyalkylene" refers to groups wherein both the alkoxy group is a lower alkoxy group and the alkylene group is a lower alkylene group. Typical alkoxyalkylene groups include, for example, methoxymethylene, pentoxyhexylene and the like.

The term "aryl" refers to aryl groups having from 6 through 14 carbon atoms and includes, for example, phenyl, naphthyl, anthryl, phenanthryl and the like.

The term aralkyl refers to the group Ar—Y— wherein Ar is aryl and Y is alkyl preferably lower alkyl and includes for example, benzyl, phenethyl, naphthylethyl and the like.

The term aryloxy refers to the group having the formula Ar—O— wherein Ar is aryl and the term arylalkoxy refers to the group Ar—Y—O— wherein Ar—Y— is arylalkyl.

The term "substituted aryl" refers to the radical having the general formula

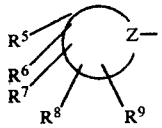

wherein

Z is aryl having 6–14 carbon atoms (e.g., phenyl, naphthyl, anthryl, phenanthryl, and preferably phenyl) and $R^5$, and $R^6$ are independently hydrogen, lower alkyl, amino, cyano, lower alkyl amino, di(lower alkyl)amino, lower alkylsulfinyl, lower alkylsulfonyl, lower alkylthiomercapto or acyloxy;

$R^7$ is hydrogen, halo, nitro, $C_1$–$C_4$ alkyl or $C_1$–$C_4$ alkoxy;

$R^8$ and $R^9$ are independently selected from the group of hydrogen and halo, preferably hydrogen;

and wherein $R^5$, $R^6$, $R^7$, $R^8$ and $R^9$ can be at any available ring carbon atom and at least one $R^5$, $R^6$, $R^7$, $R^8$, or $R^9$ is other than hydrogen.

The term substituted arylakyl refers to the group Ar'Y— wherein Ar' is substituted aryl and Y is alkyl preferably lower alkyl.

The term "di(lower alkyl)amino" refers to the group having the formula

wherein $R^{10}$ and $R^{11}$ are independently lower alkyl.

The term "acyl" refers to acyl groups derived from carboxylic acid having 2 through 12 carbon atoms such as, for example, acetyl, propionyl, butynyl, valeryl, isovaleryl, hexanoyl, octanoyl, nonanyl, undecanoyl, lawroyl, acryloyl, methacryloyl, maleoyl, oleoyl, benzoyl, phenylacetyl, and the like.

The term "acylalkyl" or "acylalkylene" refer to the group having the formula $R^{12}R^{13}$— wherein $R^{12}$ is acyl and $R^{13}$ is alkylene as defined herein.

The term "epoxyalkyl" refers to alkyl groups (preferably lower alkyl) having at least one epoxy moiety.

The term "epoxyalkoxyalkyl" refers to ethers having the formula $R^{14}$—O—$R^{15}$— wherein $R^{14}$ is epoxyalkyl and $R^{15}$ is alkyl, preferably lower alkyl. Such groups include, for example, glycidoxyalkyl.

A further understanding of the invention can be had from the following non-limiting examples.

EXAMPLE 1

This example illustrates the composition and process of the invention, and the improved water stability afforded by the present invention.

Sulfur cement aggregate compositions illustrating the present invention were prepared containing 25% by weight plasticized sulfur (95% by weight sulfur, 2.5% by weight dicyclopentadiene and 2.5% by weight cyclopentadiene oligomer); 3.0% by weight of the expansive clay, bentonite clay (4.0% based on aggregate) and the remainder Kaiser top sand having a U.S.A. Standard Testing Sieves size range of 4 mesh to 100 mesh and respectively containing 0.1 parts by wt of the organosilane, identified in Table 1 hereinbelow, per 100 parts by wt of the sulfur cement-sand-clay composition.

The test compositions were prepared by mixing the organosilane with molten-sulfur cement and then mixing the organosilane-sulfur cement mixture with a preheated mixture of sand and clay. The molten mixture (125°–135° C.) was then cast into three 2"×4" cylinder molds and aged overnight at room temperature (about 20° C.).

A control composition was prepared and cast into three cylinders in the same manner but, without the addition of the organosilane.

Representative cylinders for the control composition and each of the test compositions, of the present invention, were selected and immersed in tap water at room temperature (about 20° C.) and visually inspected daily for fractures, cracks, crumbling, etc. At the first evidence of any of these the cylinder was considered to have failed. The results of these trials are reported in Table 1 hereinbelow.

As can be seen from Table 1, the compositions of the present invention had greatly superior water stabilities as compared to the corresponding control composition. The control composition containing 4% bentonite clay aggregate only had a life of about 4 hours whereas the test compositions containing 4% bentonite clay aggregate exhibited lives of 3–28 days.

TABLE 1

| Organosilane | Parts by weight* Organosilane | Reactive Functional Group (Z) | Days to Failure |
|---|---|---|---|
| Control | None | — | about 4 hours |
| N—(2-aminoethyl)-3-amino propyl trimethoxysilane | 0.1 | diamino | 26 |
| gamma-glycidoxy propyl trimethoxysilane | 0.1 | epoxy | 24 |
| gamma-glycidoxy propyl trimethoxysilane | 0.1 | epoxy | 25 |
| gamma-methacryloxy propyl trimethoxysilane | 0.1 | methacrylic | 28 |
| phenyltriethoxysilane | 0.1 | phenyl | 13 |
| gamma-amino propyl triethoxysilane | 0.1 | amino | 10 |
| ethyl triethoxysilane | 0.1 | ethyl | 3 |
| vinyl triethoxysilane | 0.1 | vinyl | 5 |
| gamma-mercapto propyl trimethoxysilane | 0.1 | mercapto | 28 |

*Parts by weight organosilane per 100 parts of total composition (excluding organosilane).

EXAMPLE 2

In this Example the same procedure as described in Example 1 was followed using the organosilane-gamma-glycidoxy propyl trimethoxysilane sold under the Trademark DC Z6040 by the Dow-Corning Company. A number of test compositions were prepared containing different amounts of the organosilane. In each case the compositions contained 25% sulfur cement (95% by weight sulfur, 2.5% by weight dicyclopentadiene and 2.5% by weight cyclopentadiene oligomer); 75 weight % aggregate (72% Kaiser top sand plus 3% Bentonite clay) and the amount of organosilane indicated in Table 2 hereinbelow. A control sample was prepared in the same manner but without the organosilane.

In each case three cylinders were cast per composition. A representative cylinder was selected for each composition and immersed in tap water and observed for failure in the same manner as in Example 1 hereinabove. The results of these tests are recorded in Table 2 hereinbelow.

As can be seen from Table 2 the use of 0.02 to 0.5 parts of the organosilane per 100 parts of composition increased the life of the composition from about 6 hours to upwards of 7 days. Best results were obtained using 0.05 to 0.1 parts of organosilane increasing the life of the composition to upwards of 24 days.

TABLE 2

| Parts by Weight Organosilane* | Days to Failure ± |
|---|---|
| 0 | about 6 hours |
| 0.02 | 7¼ |
| 0.05 | 48 |
| 0.1 | 24 |
| 0.5 | 7 |

*Parts by weight organosilane per 100 parts by weight of sulfur cement plus aggregate (sand and clay).

Obviously, many modifications and variations of the invention described hereinabove and below can be made without departing from the essence and scope thereof.

What is claimed is:

1. A composition which comprises sulfur cement and an aggregate which is contaminated with about from 1 up to 5 percent by weight of expansive clay based on the total weight of said aggregate, and an amount of an organosilane in the range of about from 0.027 to 0.15 weight percent, based on the total weight of said aggregate, effective to substantially reduce the water expandability of said expansive clay and wherein said organosilane has at least one molten-sulfur reactive group.

2. The composition of claim 1 wherein said organosilane has the formula:

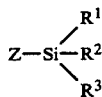

wherein Z is an organic moiety attached to Si by a carbon atom, and having at least one molten-sulfur reactive group and $R^1$, $R^2$, and $R^3$ are independently selected from the group consisting of lower alkoxy, aryloxy having 6 through 14 carbon atoms, ara-lower alkoxy having 7 through 20 carbon atoms and halo.

3. The composition of claim 2 wherein Z is selected from the group consisting of alkyl having 2 through 20 carbon atoms, cycloalkyl, aminoalkyl; aminoalkylene-aminoalkyl; N-lower alkyl-aminoalkyl; epoxyalkyl; epoxyalkoxyalkyl, alkenyl; cycloalkenyl; alkynyl; mercaptoalkyl; alkylthioalkyl; acylalkyl and acyloxy (lower alkyl) wherein said acyl has 2 through 12 carbon atoms, cyanoalkyl; hydroxyalkyl; aryl having 6 through 14 carbon atoms; ara-lower alkyl; substituted aryl having 6 through 14 carbon ring atoms and having at least one substituent selected from the group of lower alkyl, amino, cyano, lower alkylamino di(lower alkyl)amino, lower alkylsulfinyl, lower alkylsulfonyl, mercapto and lower alkylthio; and substituted ara-lower alkyl.

4. The composition of claim 3 wherein Z is selected from the group consisting of aminoalkyl; aminoalkylene-aminoalkyl; epoxyalkyl, epoxy lower alkoxy; lower alkyl, mercapto-lower alkyl unsaturated acyloxyalkyl and phenyl.

5. The composition of claim 4 wherein $R^1$, $R^2$ and $R^3$ are independently selected from the group consisting of lower alkoxy.

6. The composition of claim 4 wherein Z is selected from the group of 3-glycidoxypropyl; 3-aminopropyl; 3-(N-(2-aminoethyl)amino)propyl; 3-methacryloyloxypropyl; phenyl, 3-mercaptopropyl.

7. The composition of claim 6 wherein $R^1$, $R^2$ and $R^3$ are independently selected from the group of lower alkoxy.

8. The composition of claim 7 wherein $R^1$, $R^2$ and $R^3$ are each methoxy.

9. The composition of claim 7 wherein $R^1$, $R^2$ and $R^3$ are each ethoxy.

10. The composition of claim 2 wherein $R^1$, $R^2$ and $R^3$ are independently selected from the group of lower alkoxy.

11. The composition of claim 2 wherein $R^1$, $R^2$ and $R^3$ are independently methoxy or ethoxy.

12. The composition of claim 1 wherein said sulfur cement comprises plasticized sulfur.

13. The composition of claim 12 wherein said plasticized sulfur is plasticized with a mixture of dicyclopentadiene and oligomers of cyclopentadiene.

14. The composition of claim 1 wherein said sulfur cement comprises a particulate filler material.

15. A process for preparing a sulfur cement-aggregate composition which comprises admixing a molten-sulfur cement with an aggregate which is contaminated with about from 1 up to 5 percent by weight of expansive clay, and admixing an organosilane having at least one molten-sulfur reactive group with said composition prior to solidifying said composition and wherein an amount of said organosilane in the range of about from 0.027 to 0.15 weight percent, based on the total weight of said aggregate, effective to substantially improve the water stability of said composition is used.

16. The process of claim 15 wherein said organosilane has the formula:

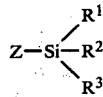

wherein Z is an organic moiety attached to Si by a carbon atom, and having at least one molten-sulfur reactive group and $R^1$, $R^2$ and $R^3$ are independently selected from the group consisting of lower alkoxy, aryloxy having 6 through 14 carbon atoms, ara-lower alkoxy having 7 through 18 carbon atoms and halo.

17. The process of claim 15 wherein said organosilane has a molten-sulfur reactive group selected from the group of mercapto, epoxy, methacrylic, diamino, and mixtures thereof.

18. The process of claim 15 wherein said organosilane is gamma-mercapto propyl trimethoxysilane.

* * * * *